United States Patent
Koch et al.

(10) Patent No.: US 6,960,879 B2
(45) Date of Patent: Nov. 1, 2005

(54) DISTORTION CORRECTION OF AN IMAGE INTENSIFIER

(75) Inventors: Andreas Koch, Grenoble (FR); Michel Codron, Voreppe (FR); Paul De Groot, St Ismier (FR)

(73) Assignee: Thales, Neuilly sur Seine (FR)

( * ) Notice: Subject to any disclaimer, the term of this patent is extended or adjusted under 35 U.S.C. 154(b) by 154 days.

(21) Appl. No.: 10/476,610
(22) PCT Filed: May 14, 2002
(86) PCT No.: PCT/FR02/01623
§ 371 (c)(1),
(2), (4) Date: Nov. 3, 2003
(87) PCT Pub. No.: WO02/095477
PCT Pub. Date: Nov. 28, 2002

(65) Prior Publication Data
US 2004/0130629 A1 Jul. 8, 2004

(30) Foreign Application Priority Data
May 18, 2001 (FR) ........................................... 01 06601

(51) Int. Cl.$^7$ ................................................ H01J 31/50
(52) U.S. Cl. ....................................... 313/530; 313/524
(58) Field of Search ................................ 313/523, 524, 313/525, 528, 103 R

(56) References Cited

U.S. PATENT DOCUMENTS

| 4,658,139 A | 4/1987 | Brennan et al. |
| 4,741,600 A | 5/1988 | Pirs et al. |

*Primary Examiner*—Vip Patel
(74) *Attorney, Agent, or Firm*—Lowe Hauptman & Berner, LLP

(57) ABSTRACT

The invention relates to the correction of distortion in an image intensifier comprising a primary screen intended for receiving first radiation and a secondary screen that emits second radiation that depends on the first radiation. The image intensifier furthermore includes means for projecting, onto the primary screen, a location test pattern produced using third radiation, and the secondary screen emits an image that depends on the location test pattern.

17 Claims, 3 Drawing Sheets

DISTORTION CORRECTION OF AN IMAGE INTENSIFIER

The invention relates to the correction of distortion in an image intensifier.

An image intensifier comprises a primary screen, intended to receive a first image, and a secondary screen emitting a second image that depends on the first. Intensifiers are used, for example, in medical radiology. In this case, the intensifier receives an image formed by X-radiation that has passed through a patient's body. The intensifier emits, on its secondary screen, a visible image that depends on the X-ray image received by the primary screen. In addition to converting the X-radiation into visible radiation that forms the visible image, the intensifier amplifies the intensity of the image received. In medical radiology, this amplification allows the dose of X-radiation received by the patient to be reduced. The amplification is carried out conventionally by converting the radiation received by the primary screen into electrons emitted in a cavity in which there is, a vacuum. The electrons are then accelerated by means of electrodes and then converted by the secondary screen into a visible image.

Of course, the invention is not limited to medical radiology—it may be used in all types of intensifier whatever the radiation received or emitted by the screens.

The use of electrons accelerated by electrodes makes the intensifier sensitive to electromagnetic interference arising from the environment of the intensifier. This interference creates spatial distortion of the image emitted by the secondary screen relative to the image received by the primary screen. It is possible to correct this distortion by placing in front of the primary screen a grid that lets through or blocks, in precise regions, the radiation received by the primary screen.

The image emitted by the secondary screen may be analyzed in order to locate, in the emitted image, the regions defined by the grid and thus determine, for each of the regions, the distortion of the image emitted by the secondary screen relative to the image received by the primary screen. For each point of the image received, it is then possible to determine the distortion by interpolation between the regions. When the intensifier is being used for receiving a useful image, it will of course be necessary to move the grid away from the scene observed by the primary screen of the intensifier. Thus, the useful image emitted by the output screen may be corrected by using the distortion values determined for each point of the image.

By proceeding in this way, it is necessary to recommence the determination of the distortion whenever the environment of the intensifier is modified, for example when an electrical machine is moved near the intensifier or when the intensifier itself is moved. In medical radiology, it is frequently the case that the intensifier is moved as it is often easier to move the X-ray source and the intensifier than the patient himself. The use of a grid that is positioned in front of the primary screen in order to determine the distortion and then removed, constitutes a procedure that is both time-consuming and tricky to implement. The procedure is time-consuming as it requires a not inconsiderable amount of time to manipulate the grid. The procedure is tricky as it requires the positioning of the grid relative to the primary screen to be controlled very accurately.

The invention proposes to alleviate these various drawbacks by proposing means for correcting the distortion in an image intensifier, which means do not require any mechanical movement and which ensure that the distortion measurements are very reproducible.

To achieve this objective, the subject of the invention is an image intensifier comprising a primary screen intended to receive first radiation and a secondary screen that emits second radiation that depends on the first radiation, characterized in that it furthermore includes means for projecting, onto the primary screen, a location test pattern produced using third radiation, and in that the secondary screen emits an image that depends on the location test pattern.

Advantageously, the location test pattern is formed from a plurality of points that are distributed over the primary screen. Thus, it is possible to analyze the distortion of the entire image received by the secondary screen.

The invention makes it possible, for example, to use an image intensifier in tomography, which requires great control of the distortion in order to allow the reconstruction of three-dimensional images. The invention also makes it possible to use an image intensifier in applications that require perfect geometrical superposition of two successive images, such as, for example, digital subtraction angiography.

Other, nonmedical applications also require low distortion and can therefore use an image intensifier according to the invention. As an example, mention may be made of X-ray diffraction or inspection operations in which images are subtracted in order to identify a deviation from a model.

The invention will be more clearly understood and other advantages will become apparent on reading the detailed description of several embodiments of the invention, the description being illustrated by the appended drawing in which.

For simplicity in the rest of the description, the same topological references will denote the same elements in the various figures.

Figure 1:
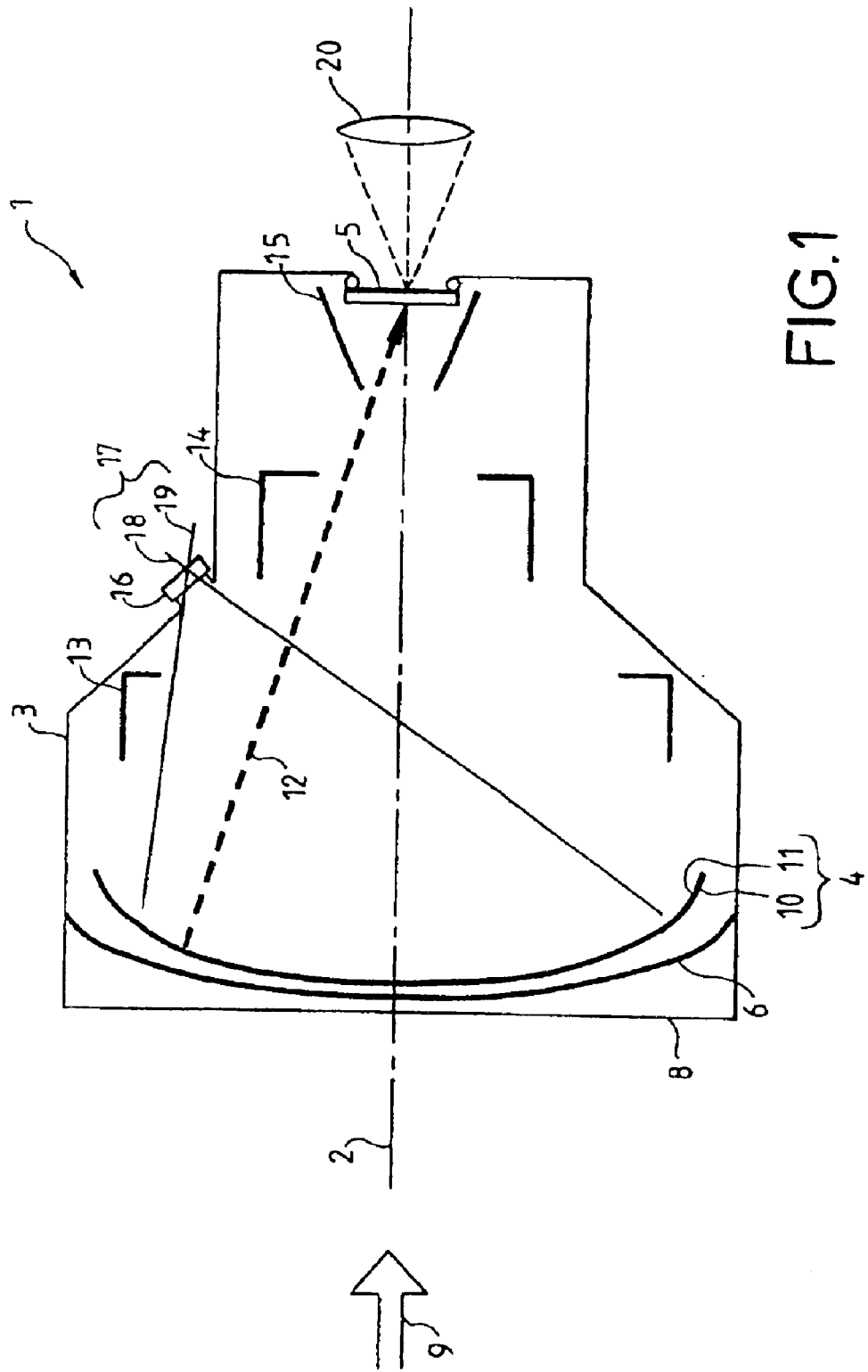
FIG. 1 shows schematically, in cross section, a first embodiment of an image intensifier according to the invention.

The image intensifier shown in FIG. 1 comprises a tube 1 substantially elongate along an axis 2. The tube 1 comprises an envelope 3 inside which there is a vacuum sufficient for electrons to be able to move therein. A primary screen 4 forms a first end of the envelope 3 and a secondary screen 5 forms a second end of the envelope 3. An entry window 6 seals the envelope 3 at its first end. It is possible to dispense with the entry window 6 and, in this case, the secondary screen 5 seals the envelope at its first end. Likewise, the secondary screen 5 seals the envelope 3 at its second end. The intensifier shown in FIG. 1 is used in medical radiology and a thin protective plate 8, permeable to X-radiation, for example made of an aluminum based alloy, may be placed, in front of the entry window 6, on the outside of the casing 3.

The X-radiation penetrates the tube 1 approximately along the axis 2 in the direction indicated by the arrow 9. This radiation, on passing through the plate 8 and the entry window 6, reaches the primary screen 4. The primary screen 4 has a scintillator material 10 on that face of the screen which receives the X-radiation, and there is a photocathode 11 on the opposite face of the primary screen. The scintillator material 10 converts the X-radiation received by the primary screen 4 into light, for example visible light. This light is then absorbed by the photocathode 11 which converts it into electrons. The electrons are then emitted inside the envelope 3 in the direction of the secondary screen 5. The schematic path of the electrons inside the envelope 3 is indicated in FIG. 1 by an arrow 12 represented in broken lines.

The tube 1 also includes several electrodes 13, 14 and an anode 15 that are located inside the envelope 3, allowing the electrons emitted by the photocathode 11 to be accelerated and guided toward the secondary screen 5. The acceleration of the electrons gives them energy allowing the image to be intensified. The secondary screen 5 receives the electrons emitted by the photocathode 11 and converts them into radiation, for example visible radiation, emitted out of the envelope 3 in the direction of the arrow 9. This visible radiation may, for example, be analyzed by a camera, shown in FIG. 1 by its entrance pupil 20. The optical axis of the entrance pupil 20 is approximately coincident with the axis 2.

According to the invention, the intensifier includes means for projecting a location test pattern onto the primary screen 4. These means comprise, for example, a window 16 located in the envelope 3. This window allows radiation 17, different from X-radiation, to illuminate the primary screen 4. In FIG. 1, this radiation is depicted by two lines 18 and 19 representing the extreme paths that it can follow. The window 16 is positioned on the envelope 3 in such a way that the radiation 17 can illuminate approximately the entire surface of the primary screen 4. In FIG. 1, the window 16 is located between the electrodes 13 and 14, but of course other positions located on the envelope 3 may be suitable.

Advantageously, the window 16 is located in such a way that the radiation 17 illuminates the primary screen 4 on the opposite face from that which receives the X-radiation. More precisely, by convention, the front face of the primary screen 4 is defined as the face via which the primary screen 4 receives the X-radiation and the rear of the primary screen 4 is defined as the face via which the photocathode 11 emits electrons. In the example shown in FIG. 1, the radiation 17 illuminates the photocathode 11 directly via the rear of the primary screen 4.

Figure 2:
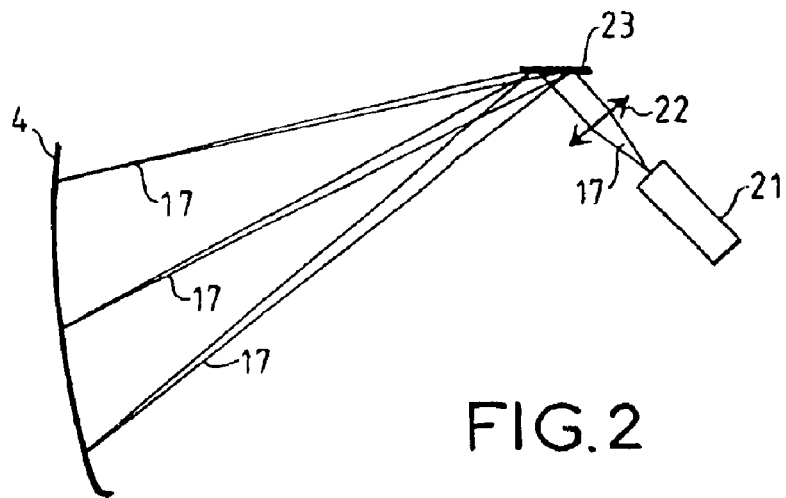
FIG. 2 shows schematically an example of an optical device for focusing a location test pattern on the primary screen.

The optical device shown schematically in FIG. 2 includes a source 21 that emits the radiation 17. The source 21 is advantageously monochromatic and focused by means of a lens 22 onto the primary screen 4. To produce the source 21, it is possible to use a solid-state laser, such as those used as a pointer. This type of laser has the advantage of being inexpensive. The wavelength of the laser is chosen so that the photocathode 11 is sensitive at this wavelength. The beam of radiation 17 thus focused is reflected off the surface of the diffraction grating 23 in order to be sent onto the primary screen 4 onto which the radiation 17 is focused.

Figure 3:
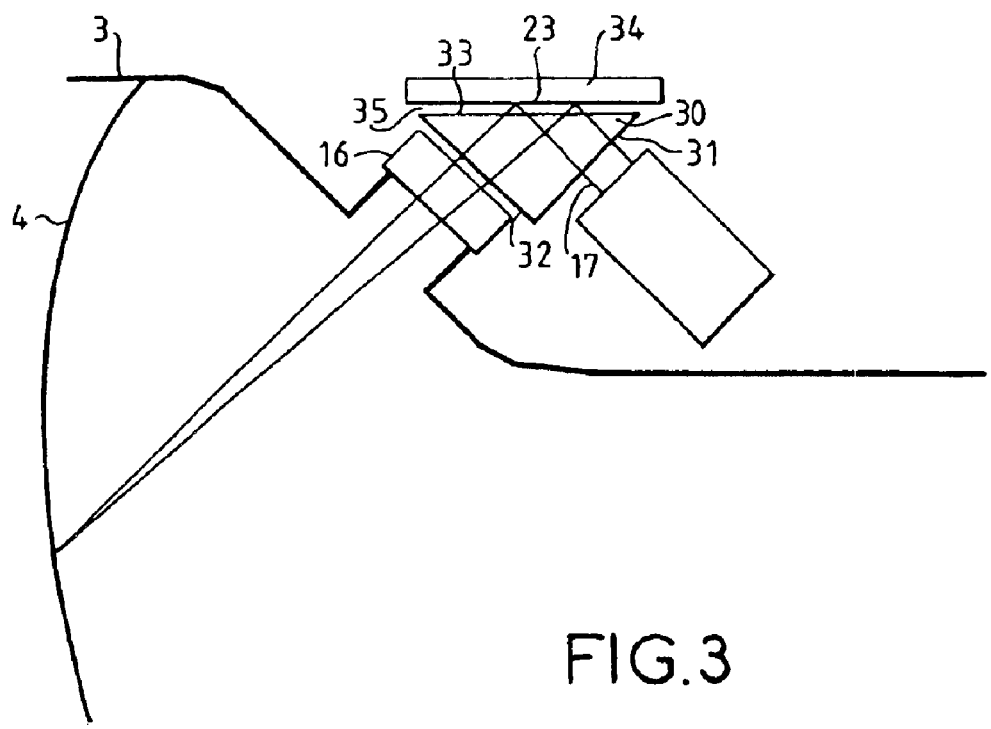
FIG. 3 shows an embodiment of the device shown in FIG. 2.

FIG. 3 shows an embodiment, given by way of example, of the device shown in FIG. 2. In this embodiment, the means 16 comprise a prism 30. The radiation 17 emanating from the source 21 passes through the prism 30 before entering the envelope 3 via the window 16. The prism 30 has three faces 31, 32 and 33. The radiation 17 penetrates the prism 30 via the face 31 and emerges therefrom via the face 32. The diffraction grating 23 is placed on the third face 33 of the prism 30. This embodiment has the advantage of having few diopters in the path of the radiation 17. The diffraction grating 23 may be produced directly on the face 33 of the prism 30. It may also be produced on a substrate 34 separate from the prism 30. The substrate 34 is then cemented to the face 33 using an optical cement 35 of the same optical index as the prism 30. This same cement may also be used to cement the face 32 of the prism 30 to the window 16.

The diffraction grating 23 may, for example, be produced using a periodic pattern or holography.

The source 21 is rigidly fixed to the envelope 3. This is necessary so that the location test pattern, produced by means of the radiation 17, contains a constant position relative to the primary screen 4 even when the image intensifier is being moved.

Figure 4:
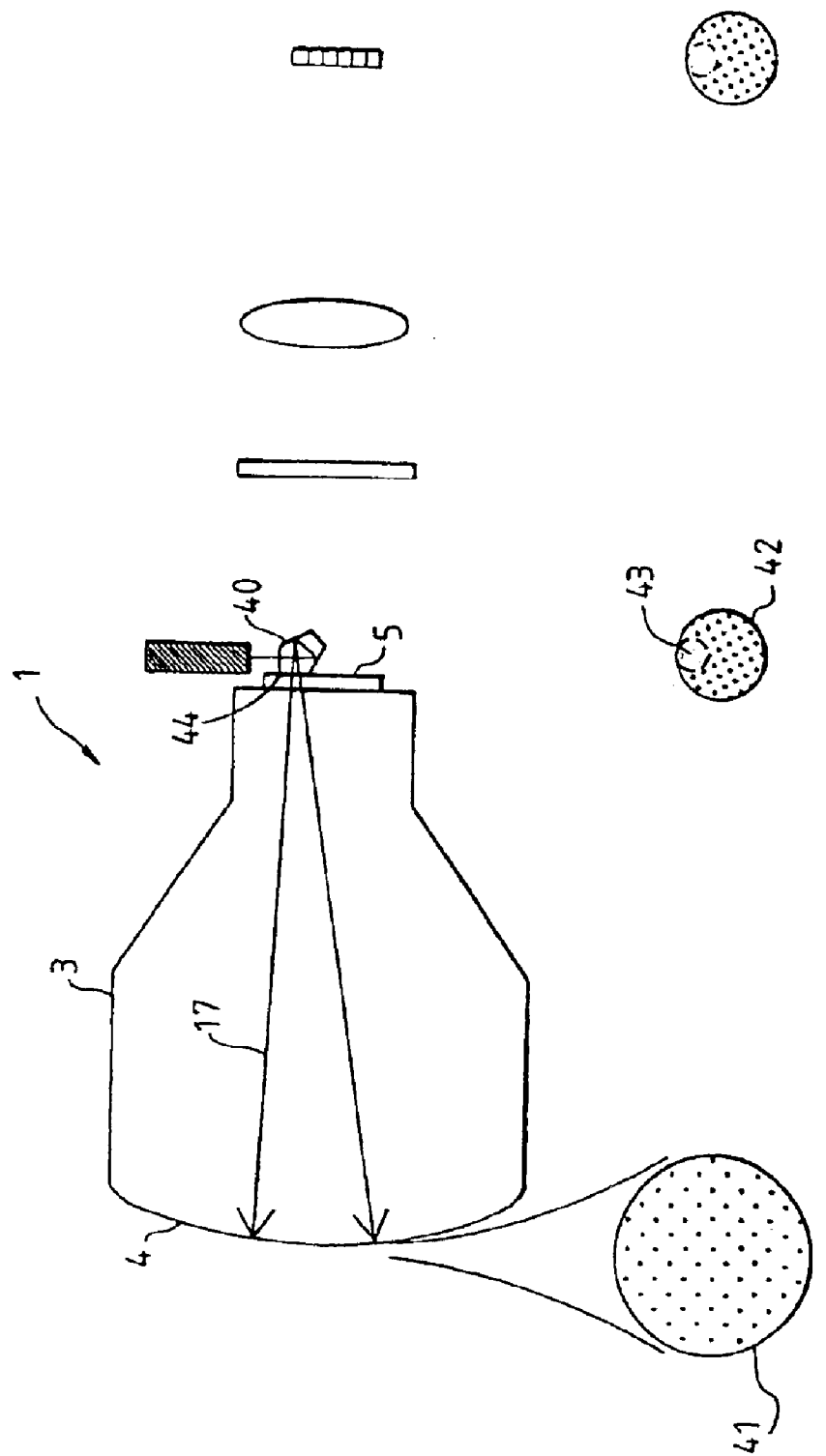
FIG. 4 shows another embodiment of the device according to the invention.

FIG. 4 shows another embodiment of the invention, which embodiment is suitable for an existing tube 1 on which it is not desired to produce a window 16 separate from the other existing windows. It is therefore possible to use a part 44 of the secondary screen 5 as window for introducing the radiation 17 into the envelope 3. This part is then made transparent to the radiation 17. For example, when the secondary screen 5 has a phosphor-based scintillator material intended to convert the electrons emitted by the photocathode 11 into visible radiation, the phosphor is removed from the secondary screen in the part 44 so as to allow the radiation 17 to penetrate the envelope 3. The source 21 is located near the secondary screen and a prism 40 is used, for example, to send the radiation 17 onto the primary screen 4. The prism 40 is fastened to the part 44.

FIG. 4 also shows an example of a location test pattern 41 produced on the primary screen 4 using the radiation 17. The location test pattern 41 is formed, for example, from regularly spaced-apart points. These points form the intersections of the rows and columns of a checkerboard. The primary screen 4 sends an image 42 of the location test pattern 41 onto the secondary screen 5. This image 42 repeats, of course, the various points of the location test pattern 41. The distribution of these points is possibly impaired by the distortion generated by the image intensifier. The example of the location test pattern 41 shown in FIG. 4 may be used whatever the position of the window 16 on the surface of the envelope 3. In the embodiment shown in FIG. 4, the image 41 is not complete—a region 43 of the image 42, corresponding to the part 44, appears masked to an observer outside the envelope 3 because of the presence of the prism 40 on the secondary screen 5.

Advantageously, the image intensifier includes means for analyzing the distribution of the plurality of points of the location test pattern 41 that are received by the secondary screen 5. More precisely, this distortion is measured by analyzing the distribution of the points in the image 42 of the location test pattern 41. In the case of the points of the image that lie between the points of the location test pattern 41, the distortion may be determined by interpolation from the distortion measured for the points of the location test pattern 41 that are closest to the point in question of the image. The measurement may be absolute and the analysis consists in comparing the distribution of points in the image 42 relative to a theoretical distribution. The measurement may be relative and, in this case, the comparison is made relative to an image 42 produced in a calibration phase during which the distortion of the image is controlled.

The distortion may be measured in the absence of X-radiation received by the primary screen 4. For this purpose, means are provided for interrupting the emission of the radiation 17 by the source 21. However, the radiation 17 does not impair the electron emission by the photocathode 11. It is therefore possible to measure the distortion even when the image intensifier is in normal operation and is receiving X-radiation.

The distortion is measured very rapidly, in a fraction of a second.

What is claimed is:

1. An image intensifier, comprising:

a primary screen intended to receive first radiation;

a secondary screen that emits second radiation that depends on the first radiation;

means for projecting onto the primary screen, a location test pattern formed from a plurality of points that are distributed over the primary screen;

wherein said test pattern is produced using third radiation, and wherein the secondary screen emits an image that depends on the location test pattern.

2. The image intensifier as claimed in claim 1, wherein the means for projecting the location test pattern onto the primary screen comprise a window via which the third radiation penetrates inside an envelope that contains the primary screen and the secondary screen and in that the window is placed on the surface of the envelope in such a way that the third radiation can illuminate substantially the entire surface of the primary screen.

3. The image intensifier as claimed in claim 2, wherein the window is located in such a way that the third radiation illuminates the primary screen via one face of the primary screen, which face is on the opposite side from that which receives the first radiation.

4. The image intensifier as claimed in claim 1, wherein the primary screen includes a photocathode intended to convert the first radiation and the third radiation into electrons emitted in the direction of the secondary screen.

5. The image intensifier according to claim 1, wherein that the means for projecting a location test pattern onto the primary screen comprise a monochromatic source that emits the third radiation onto the primary screen.

6. The image intensifier as claimed in claim 5, wherein the means for projecting a location test pattern onto the primary screen comprise a prism having three faces, in that the third radiation penetrates the prism via a first face and emerges therefrom via a second face and in that the diffraction grating is placed on the third face of the prism.

7. The image intensifier as claimed in claim 5, wherein the source has a position that is fixed relative to the primary screen.

8. The image intensifier as claimed in claim 1, further including means for interrupting the emission of the third radiation.

9. The image intensifier as claimed in claim 1, wherein said image intensifier includes means for analyzing the distribution of the plurality of points of the location test pattern that are received by the secondary screen.

10. An image intensifier, comprising:

a primary screen intended to receive first radiation;

a secondary screen that emits second radiation that depends on the first radiation;

a window via which a third radiation penetrates inside an envelope that contains the primary screen and the secondary screen and in that the window is placed on the surface of the envelope in such a way that the third radiation can illuminate substantially the entire surface of the primary screen; and wherein a test pattern is produced using third radiation, and wherein the secondary screen emits an image that depends on the location test pattern.

11. The image intensifier as claimed in claim 10, wherein the window is located in such a way that the third radiation illuminates the primary screen via one face of the primary screen, which face is on the opposite side from that which receives the first radiation.

12. The image intensifier as claimed in claim 10, wherein the primary screen includes a photocathode intended to convert the first radiation and the third radiation into electrons emitted in the direction of the secondary screen.

13. The image intensifier according to claim 10, wherein the means for projecting a location test pattern onto the primary screen comprise a monochromatic source that emits the third radiation onto the primary screen.

14. The image intensifier as claimed in claim 13, wherein the means for projecting a location test pattern onto the primary screen comprise a prism having three faces, in that the third radiation penetrates the prism via a first face and emerges therefrom via a second face and in that the diffraction grating is placed on the third face of the prism.

15. The image intensifier as claimed in claim 13, wherein the source has a position that is fixed relative to the primary screen.

16. The image intensifier as claimed in claim 10, further including means for interrupting the emission of the third radiation.

17. The image intensifier as claimed in claim 10, wherein said image intensifier includes means for analyzing the distribution of the plurality of points of the location test pattern that are received by the secondary screen.

\* \* \* \* \*